(12) United States Patent
Jung et al.

(10) Patent No.: US 11,187,934 B2
(45) Date of Patent: Nov. 30, 2021

(54) DISPLAY APPARATUS

(71) Applicant: SAMSUNG ELECTRONICS CO., LTD., Suwon-si (KR)

(72) Inventors: Ii Yong Jung, Yongin-si (KR); Wook-Jae Jeon, Hwaseong-si (KR); Young Chul Lee, Hwaseong-si (KR); Jun Sung Choi, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/757,493

(22) PCT Filed: Oct. 18, 2018

(86) PCT No.: PCT/KR2018/012353
§ 371 (c)(1),
(2) Date: Apr. 20, 2020

(87) PCT Pub. No.: WO2019/078648
PCT Pub. Date: Apr. 25, 2019

(65) Prior Publication Data
US 2020/0249522 A1 Aug. 6, 2020

(30) Foreign Application Priority Data
Oct. 19, 2017 (KR) .................. 10-2017-0135983

(51) Int. Cl.
*G02F 1/1335* (2006.01)

(52) U.S. Cl.
CPC .. *G02F 1/133512* (2013.01); *G02F 1/133528* (2013.01)

(58) Field of Classification Search
None
See application file for complete search history.

(56) References Cited

U.S. PATENT DOCUMENTS 5,253,089 A * 10/1993 Imai ............... G02B 6/0021
349/65
5,629,784 A * 5/1997 Abileah ........... G02F 1/133504
349/112

(Continued)

FOREIGN PATENT DOCUMENTS

JP   2005-338270 A   12/2005
JP   2008-233824 A   10/2008

(Continued)

OTHER PUBLICATIONS

Espacenet English machine translation of JP2005338270A (Year: 2005).*

(Continued)

*Primary Examiner* — Edward J Glick
*Assistant Examiner* — David Y Chung
(74) *Attorney, Agent, or Firm* — Sughrue Mion, PLLC

(57) ABSTRACT

The present disclosure relates to a display apparatus including a liquid crystal panel, first and second polarizing plates coupled to the front and rear of the liquid crystal panel, respectively, and a light absorbing layer on which light passed sequentially through the first polarizing plate, the liquid crystal panel is incident, wherein the light absorbing layer is disposed on a front surface of the second polarizing plate positioned in the front of the liquid crystal panel. The light absorbing layer includes a first resin layer, a second resin layer on which light passed through the first resin layer is incident, the second resin layer having a refractive index higher than that of the first resin layer, and light absorbing portions disposed on the first resin layer and configured to absorb a part of light passing through the light absorbing layer. Through this configuration, a viewing angle of the display apparatus is improved.

8 Claims, 19 Drawing Sheets

(56) References Cited

U.S. PATENT DOCUMENTS

| | | | | |
|---|---|---|---|---|
| 8,721,153 B2* | 5/2014 | Kinder | ................ | G02B 6/0053 |
| | | | | 362/626 |
| 2007/0153377 A1* | 7/2007 | Goto | ..................... | G02B 5/045 |
| | | | | 359/460 |
| 2015/0285963 A1* | 10/2015 | Asaoka | ................ | G02B 5/0268 |
| | | | | 349/112 |

FOREIGN PATENT DOCUMENTS

| | | |
|---|---|---|
| JP | 2010-217871 A | 9/2010 |
| KR | 10-0806165 B1 | 2/2008 |
| KR | 10-1195849 B1 | 11/2012 |

OTHER PUBLICATIONS

Espacenet English machine translation of JP2008233824A (Year: 2008).*

International Search Report (PCT/ISA/210) dated Feb. 12, 2019 by the International Searching Authority in counterpart International Patent Application No. PCT/KR2018/012353.

Written Opinion (PCT/ISA/237) dated Feb. 12, 2019 by the International Searching Authority in counterpart International Patent Application No. PCT/KR2018/012353.

* cited by examiner

DISPLAY APPARATUS

TECHNICAL FIELD

The present disclosure relates to a display apparatus, and more particularly, to a display apparatus having an improved viewing angle.

BACKGROUND ART

The display apparatus, which is a kind of output device that converts acquired or stored electrical information into visual information and displays the information to a user, is used in various fields such as a home and a business place.

In general, a display apparatus is a device for displaying an image, such as a monitor and a television. The display apparatus uses a self-emissive display panel such as an organic light-emitting diode (OLED) and a light-emissive display panel such as a liquid crystal display (LCD) panel.

In such a display apparatus, it is difficult to form a perfect black screen by a light source. That is, because the light source is turned on while the display apparatus is operating, it is difficult to express black color on the screen due to some light.

DISCLOSURE

Technical Problem

The present disclosure is directed to providing a display apparatus with improved color reproducibility.

The present disclosure is directed to providing a display apparatus improving a difference in the quantity of light depending on a viewing angle.

Technical Solution

One aspect of the present disclosure provides a display apparatus including a light source configured to generate light; and a display panel configured to receive light from the light source, wherein the display panel includes: a liquid crystal panel; first and second polarizing plates coupled to the front and rear of the liquid crystal panel, respectively; and a light absorbing layer on which light passed sequentially through the first polarizing plate, the liquid crystal panel is incident, the light absorbing layer being disposed on a front surface of the second polarizing plate positioned in the front of the liquid crystal panel, and wherein the light absorbing layer includes: a first resin layer; a second resin layer on which light passed through the first resin layer is incident, the second resin layer having a refractive index higher than that of the first resin layer; and light absorbing portions disposed on the first resin layer and configured to absorb a part of light passing through the light absorbing layer.

Light inclined by a predetermined angle or more from a reference axis in the front-rear direction in the light incident on the light absorbing layer may be absorbed by the light absorbing portions.

The light absorbing portions may be formed to be elongated in one direction on the first resin layer and arranged in a direction orthogonal to the one direction, and cross sections of the light absorbing portions may be formed such that a length in the front-rear direction is longer than a width in the left-right direction.

The first resin layer may include: an optical surface facing the second polarizing plate to allow the light sequentially passed through the first polarizing plate, the liquid crystal panel, and the second polarizing plate to be incident thereon; and a plurality of grooves formed to be recessed on the optical surface, and the light absorbing portions may be disposed in the plurality of grooves.

The plurality of grooves may be formed to be elongated in one direction on the optical surface and arranged in a direction orthogonal to the one direction, and cross sections of the plurality of grooves may be formed in a trapezoidal shape whose a width thereof becomes narrow according to a depth thereof.

The display panel may further include an adhesive layer disposed between the optical layer and the second polarizing plate to adhere the optical layer and the second polarizing plate, and the adhesive layer may be formed with a refractive index equal to or less than that of the first resin layer.

The light absorbing portion may include black resin.

The light absorbing portion may include one of carbon black, graphite powder, gravure ink, black spray, and black enamel.

A cross-sectional shape of the light absorbing portion may include at least one of a quadrangle, a semicircle, and an ellipse.

The light absorbing portions may include a first light absorbing portion, a second light absorbing portion spaced apart from the first absorbing layer by a first distance, and a third light absorbing portion spaced apart from the second absorbing layer by a second distance, and the first and second distances may be different from each other.

The one direction may include one of a longitudinal direction, a transverse direction and a diagonal direction.

The light absorbing portions may be elongated in a wave shape along the one direction.

The light absorbing portions may be formed in a dot shape and distributed to be spaced apart from each other on the first resin layer.

Another aspect of the present disclosure provides a display apparatus including a light source configured to generate light; and a display panel configured to receive light from the light source, wherein the display panel includes: a liquid crystal panel; first and second polarizing plates coupled to the front and rear of the liquid crystal panel, respectively; and a light absorbing layer on which light passed sequentially through the first polarizing plate, the liquid crystal panel, and the second polarizing plate is incident, the light absorbing layer being disposed on a front surface of the second polarizing plate positioned in the front of the liquid crystal panel, and wherein the light absorbing layer includes: first and second resin layers having different refractive indices; and light absorbing portions formed on the first resin layer closer to the second polarizing plate among the first and second resin layers, the light absorbing portions configured to absorb a part of the light passing through the light absorbing layer.

The second resin layer may be formed to be in contact with the first resin layer such that the light passed through the first resin layer is incident thereon and may have a higher refractive index than the first resin layer.

The first resin layer may include: an optical surface facing the second polarizing plate to allow the light sequentially passed through the first polarizing plate, the liquid crystal panel, and the second polarizing plate to be incident thereon; and a plurality of grooves formed to be recessed on the optical surface, and the light absorbing portions may be disposed in the plurality of grooves.

Another aspect of the present disclosure provides a display apparatus including a light source configured to generate light; and a display panel configured to receive light from the light source, wherein the display panel includes: a liquid crystal panel; first and second polarizing plates coupled to the front and rear of the liquid crystal panel, respectively; and a light absorbing layer coupled on a front surface of the second polarizing plate positioned in the front of the liquid crystal panel, and wherein the light absorbing layer includes: a first resin layer having an optical surface and a groove recessed on the first optical surface; a second resin layer in contact with a second optical surface opposite to the first optical surface of the first resin layer, the second resin layer having a refractive index higher than that of the first resin layer; and a light absorbing portion disposed in the groove and configured to absorb a part of the light passing through the light absorbing layer.

Light supplied to the display panel by the light source may sequentially pass through the first polarizing plate, the liquid crystal panel, and the second polarizing plate and may be incident on the light absorbing layer.

Advantageous Effects

According to an aspect of the present disclosure, the expression of black color can be improved by improving the structure of a display panel.

According to an aspect of the present disclosure, a difference in image quality according to a viewing angle can be minimized by improving a difference in the quantity of light according to the viewing angle.

MODE OF THE INVENTION

Figure 1:
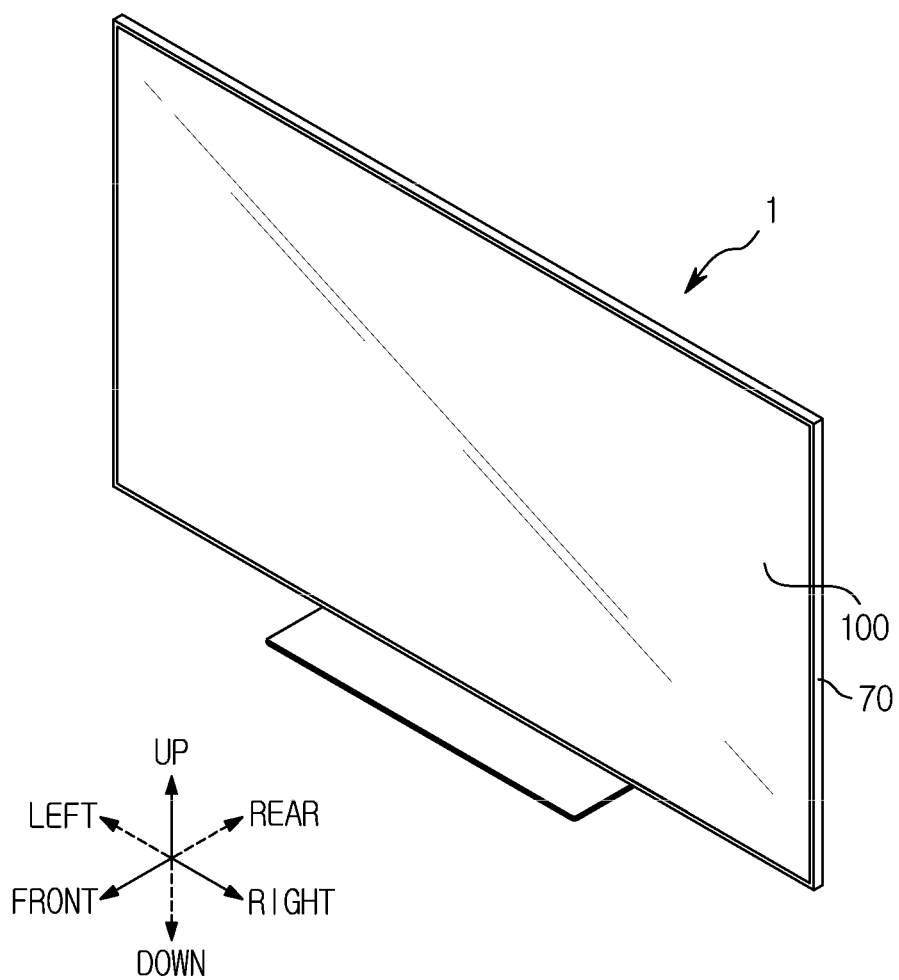
FIG. 1 is a perspective view of a display apparatus according to an embodiment of the present disclosure.

The embodiments described in the present specification and the configurations shown in the drawings are only examples of preferred embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms. These terms are only used to distinguish one component from another. For example, without departing from the scope of the present disclosure, the first component may be referred to as a second component, and similarly, the second component may also be referred to as a first component. The terra "and/or" includes any combination of a plurality of related items or any one of a plurality of related items.

Hereinafter, the embodiments of the present disclosure will be described in detail with reference to the accompanying drawings.

Figure 2:
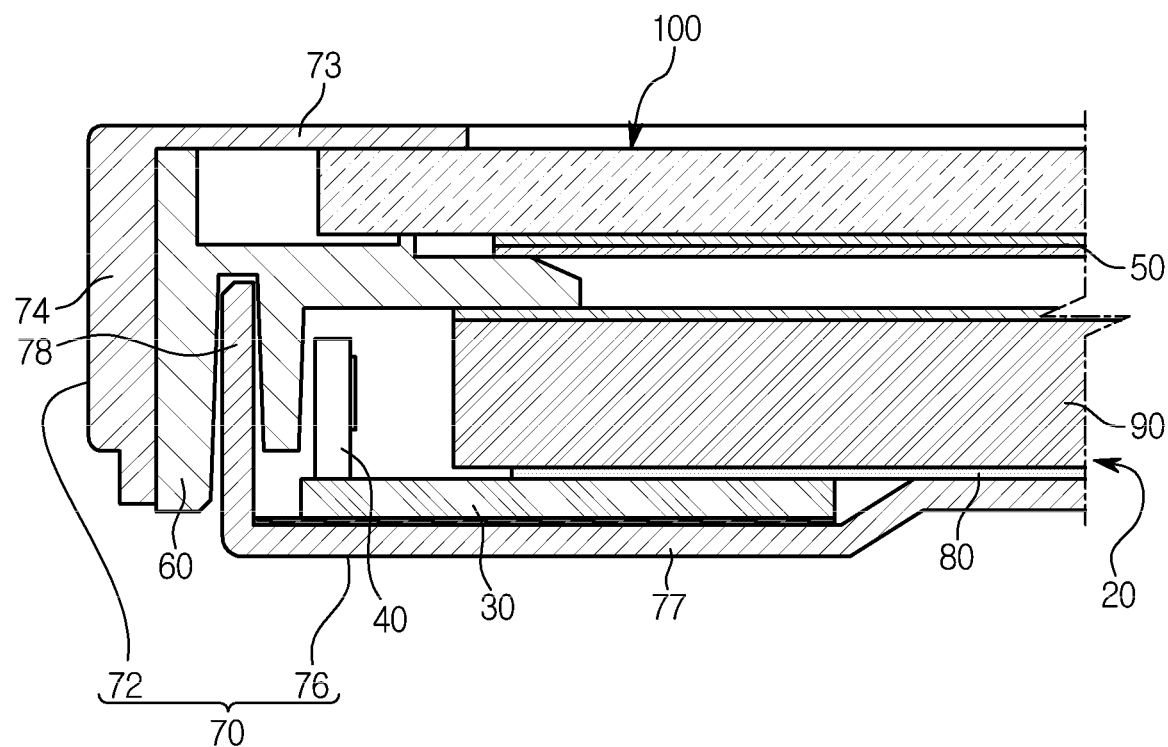
FIG. 2 is a cross-sectional view of the display apparatus according to an embodiment of the present disclosure.

FIG. 1 is a perspective view of a display apparatus according to an embodiment of the present disclosure, and FIG. 2 is a cross-sectional view of the display apparatus according to an embodiment of the present disclosure.

Although the present disclosure describes a flat display apparatus 1 as an example, the display apparatus 1 may be implemented not only as a flat display apparatus but also as a curved display apparatus having a fixed curvature screen and a variable curvature display apparatus capable of changing the curvature of the screen, and it will be readily understood by those skilled in the art that the present disclosure is not limited thereto.

The display apparatus 1 includes a display module to display an image.

The display module includes a display panel 100 on which an image is displayed and a backlight unit 20 to supply light to the display panel 100. The backlight unit 20 may include a printed circuit board 30, a light source module 40, a light guide plate 90, and an optical sheet 50. That is, the backlight unit 20 may include the light source module 40 disposed in the rear of the display panel 100, the light guide plate 90 disposed in a space between the display panel 100 and the light source module 40 to diffuse the light supplied from the light source module 40 to be transmitted to the display panel 100 located at the front thereof, and the optical sheet 50 disposed between the display panel 100 and the light source module 40 to change optical properties. The display apparatus 1 may include a middle mold 60 supporting the display panel 100 and a display chassis 70 forming an outer appearance. The display chassis 70 includes a top chassis 72 coupled to a front side of the middle mold 60 to maintain a state in which the display panel 100 is installed in the middle mold 60, and a bottom chassis 76 coupled to the rear of the middle mold 60 and having the above-described light source module 40 disposed on inner opposite sides thereof.

The light source module 40 may be disposed in the front of the bottom chassis 76 to irradiate light toward the display panel 100. The light source module 40 may include a point light source emitting monochromatic light or white light.

Although an embodiment of the present disclosure describes a direct display method, the present disclosure is not limited thereto, and may also be applied to an edge display method.

The display panel 100 and the top chassis 72 are installed in order in the front side of the middle mold 60 and the bottom chassis 76 is installed in a rear side of the middle mold 60, thereby maintaining the display panel 100 and the bottom chassis 76 in a state of being spaced apart from each other as well as supporting the respective components.

The top chassis 72 includes a bezel portion 73 covering a front outer side of the display panel 100, and a top side portion 74 bent rearward from an end of the bezel portion 73 to cover a side surface of the middle mold 60.

The bottom chassis 76 includes a rear surface portion 77 forming a rear surface of the display module and a bottom side surface portion 78 extending from a circumference of the rear portion 77 and fitted into the middle mold 60. The bottom chassis 76 is formed in a high strength polygonal plate shape and may include a metal material (for example, aluminum or an aluminum alloy) having low thermal deformation due to heat generation of the light source 70 and/or the display panel 100 stored therein. The bottom chassis 76 may be formed in a plastic material (for example, polycarbonate (PC)) or by adding glass fiber to a plastic material.

A plurality of the light source modules 40 may be mounted on the printed circuit board 30. A size of the printed circuit board 30 may correspond to a size of the display panel 100. The plurality of light source modules 40 may be arranged in a plurality of rows on the printed circuit board 30. The plurality of light source modules 40 may be arranged in a plane shape on the printed circuit board 30. The light source module 40 will be described in detail later.

A reflective sheet 80 reflects the light irradiated from the light source module 40 toward the display panel 100, or reflects the light reflected back by the optical sheet 50 or the display panel 100 back toward the display panel 100. The reflective sheet 80 is disposed on a front surface of the printed circuit board 30 and reflects the leaked light toward the display panel 100 to improve the light efficiency. The reflective sheet 80 may be disposed between the light guide plate 90 and the bottom chassis 76. The reflective sheet 80 may be coated with a high reflective coating agent (for example, silver; $TiO_2$) of white color or silver color. The reflective sheet 80 may include a reflecting plate.

The optical sheet 50 may allow the light irradiated from the light source module 40 toward the display panel 100 to have a uniform luminance. Light of uniform luminance passed through the optical sheet 50 is incident on the display panel 100. The optical sheet 50 may include a protective sheet, a prism sheet, or a diffuser sheet. The optical sheet may include at least one sheet.

Figure 3:
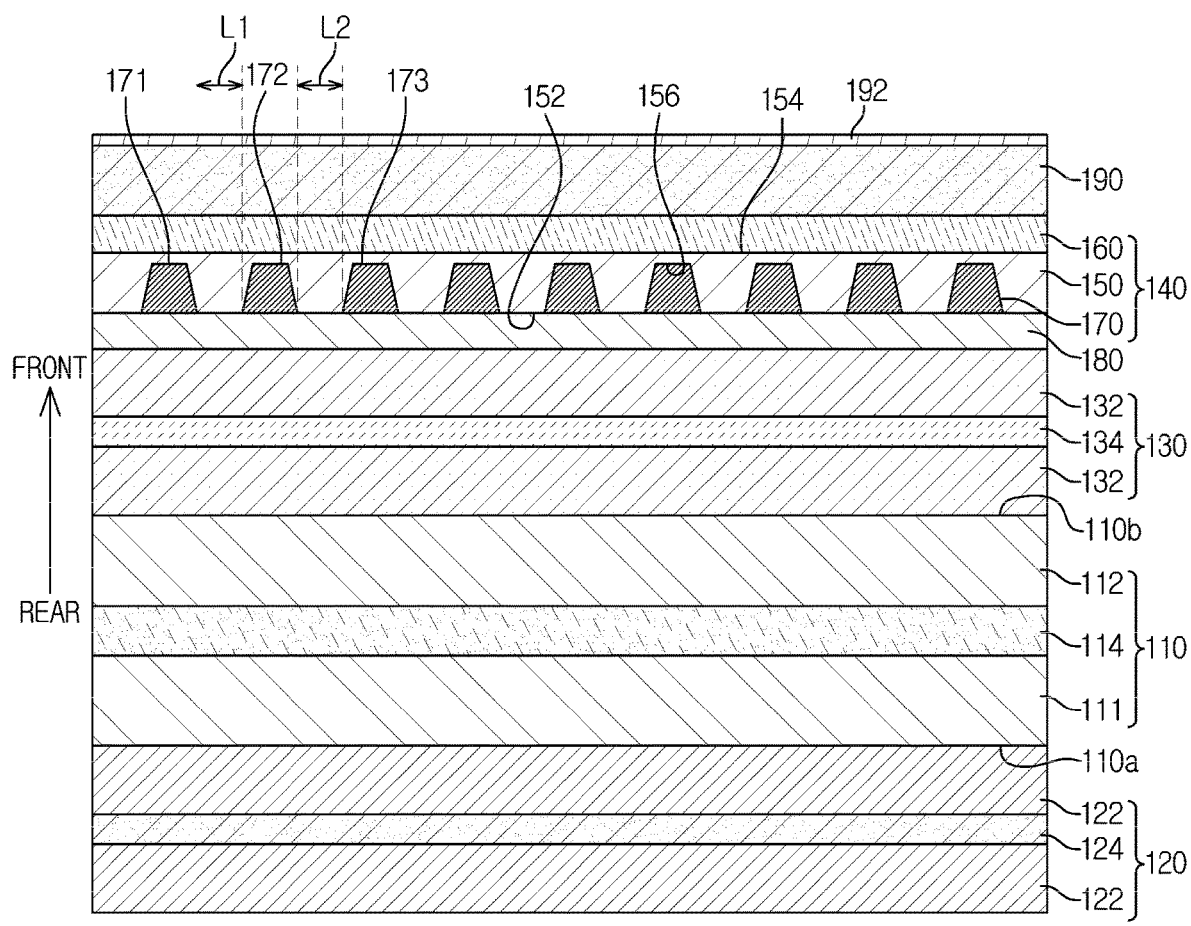
FIG. 3 is a cross-sectional view of a display panel of the display apparatus according to an embodiment of the present disclosure.
Figure 4:
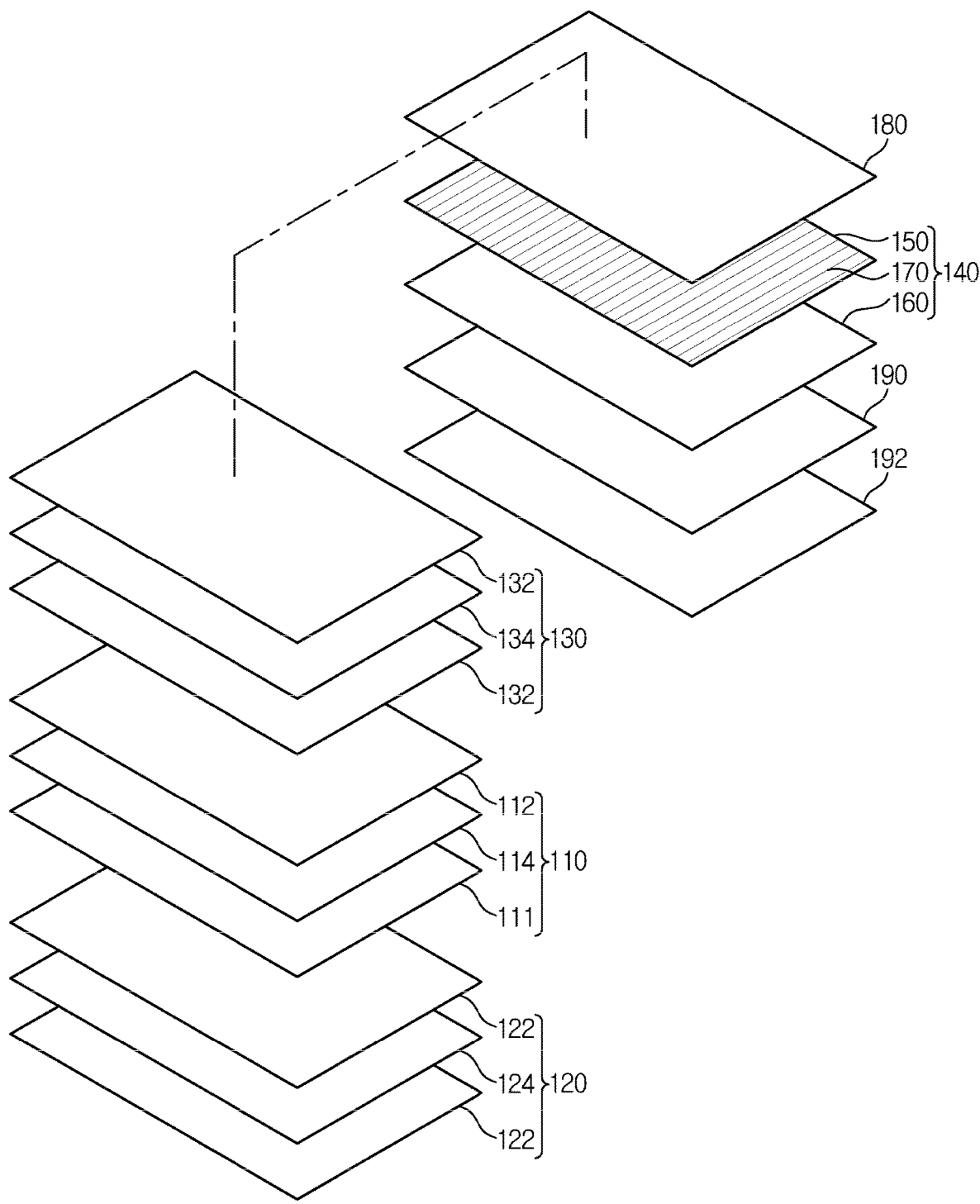
FIG. 4 is an exploded perspective view of the display panel of the display apparatus according to an embodiment of the present disclosure.
Figure 5:
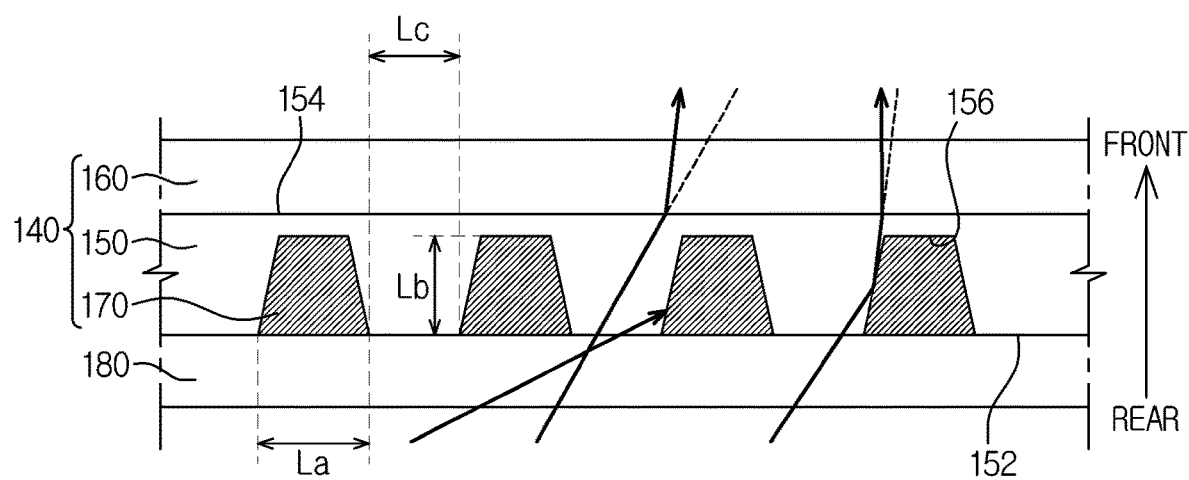
FIG. 5 is an enlarged view of a partial configuration of the display apparatus according to an embodiment of the present disclosure.

FIG. 3 is a cross-sectional view of a display panel of the display apparatus according to an embodiment of the present disclosure, FIG. 4 is an exploded perspective view of the display panel of the display apparatus according to an embodiment of the present disclosure, and FIG. 5 is an enlarged view of a partial configuration of the display apparatus according to an embodiment of the present disclosure.

The display panel 100 may display an image by converting an electrical signal into an optical signal. The display panel 100 may include a liquid crystal panel 110 and polarizing plates 120 and 130.

The liquid crystal panel 110 is provided in the front of the backlight unit 20 to block or transmit light emitted from the backlight unit 20 in order to form an image.

A front surface of the liquid crystal panel 20 forms a screen of the display apparatus 1 described above and may be composed of a plurality of pixels. The plurality of pixels included in the liquid crystal panel 20 may independently block or transmit light of the backlight unit 20, and light transmitted by the plurality of pixels may form an image displayed on the display apparatus 1.

The liquid crystal panel 110 may include first and second transparent substrates 111 and 112 and a liquid crystal layer 114. The liquid crystal panel 110 may also include a pixel electrode, a thin film transistor, a common electrode, and a color filter (not shown). The first and second transparent substrates 111 and 112 form an outer appearance of the liquid crystal panel 110 and may protect the liquid crystal layer 114 and the color filter that are provided therebetween. The first and second transparent substrates 111 and 112 may be made of tempered glass or transparent resin.

The liquid crystal represents an intermediate state between a solid (crystal) and a liquid. In general, when a solid material is heated, the state changes from a solid state to a transparent liquid state at the melting temperature. On the other hand, when heat is applied to a liquid crystal material in a solid state, the liquid crystal material changes to a transparent liquid state after changing to an opaque and cloudy liquid at the melting temperature. Most of the liquid crystal materials are organic compounds, their molecules have a long and narrow rod shape, and the arrangement of the molecules may have an irregular shape in some directions, but may have a regular shape in other directions. As a result, the liquid crystal has both the fluidity of liquid and optical anisotropy of crystal (solid).

The liquid crystal may also exhibit optical properties depending on the change of the electric field. For example, the direction of the molecular arrangement constituting the liquid crystal may change depending on the change of the electric field.

When an electric field is generated in the liquid crystal layer 114, the liquid crystal molecules of the liquid crystal layer 114 may be arranged according to the direction of the electric field, and when an electric field is not generated in the liquid crystal layer 114, the liquid crystal molecules may be arranged irregularly or arranged along an alignment film (not shown).

As a result, the optical properties of the liquid crystal layer may change depending on the presence or absence of an electric field passing through the liquid crystal layer 114. For example, when an electric field is not formed in the liquid crystal layer 114, light polarized by a first polarizing film 124 may pass through a second polarizing film 134 after passing through the liquid crystal layer 114 due to the arrangement of the liquid crystal molecules of the liquid crystal layer 114. On the other hand, when an electric field is formed in the liquid crystal layer 114, the arrangement of the liquid crystal molecules of the liquid crystal layer 114 changes so that light polarized by the first polarizing film 124 does not pass through the second polarizing film 134.

The polarizing plates 120 and 130 may be provided outside the first and second transparent substrates 111 and 112.

The polarizing plates 120 and 130 include the first polarizing plate 120 provided outside the first transparent substrate 111 and the second polarizing plate 130 provided outside the second transparent substrate 112.

The first polarizing plate 120 may be disposed to be in contact with a first surface 110a of the liquid crystal panel 110. The first polarizing plate 120 may include a first protective film 122 and the first polarizing film 124. A pair of the first protective film 122 may be provided to protect the front and rear of the first polarizing film 124. The first protective film 122 may be formed of a material having durability and non-optical properties. The first protective film 122 may include a tri-acetyl cellulose (TAC) film, PET, and acrylic.

The first polarizing film 124 may be disposed to be in contact with the first protective film 122. In the present embodiment, the first polarizing film 124 may be positioned between the pair of first protective films 122. The first polarizing film 124 may include poly vinyl alcohol (PVA). The first polarizing film 124 may include a dichroic material that polarizes light in a specific direction in polyvinyl alcohol.

The second polarizing plate 130 may be disposed to be in contact with a second surface 110b of the liquid crystal panel 110. The second polarizing plate 130 may include a second protective film 132 and the second polarizing film 134. A pair of the second protective film 132 may be provided to protect the front and rear of the second polarizing film 134. The second protective film 132 may be formed of a material having durability and non-optical properties. The second protective film 132 may include a tri-acetyl cellulose (TAC) film, PET, and acrylic.

The second polarizing film 134 may be disposed to be in contact with the second protective film 132. In the present embodiment, the second polarizing film 134 may be positioned between the pair of second protective films 132. The second polarizing film 134 may include poly vinyl alcohol (PVA). The second polarizing film 134 may include a dichroic material that polarizes light in a specific direction in polyvinyl alcohol.

Light may be formed with a pair of an electric field and a magnetic field that oscillate in a direction orthogonal to the traveling direction. The electric field and the magnetic field constituting the light may oscillate in all directions orthogonal to the traveling direction of light. The phenomenon that an electric or magnetic field oscillates only in a specific direction is called polarization, and a film that transmits light including an electric field or a magnetic field oscillating in a predetermined direction and blocks light including an electric field and a magnetic field oscillating in a direction other than the predetermined direction is called a polarizing film, That is, the polarizing film may transmit light oscillating in a predetermined direction and block light oscillating in another direction.

The first polarizing film 124 transmits light having an electric field and a magnetic field oscillating in a first direction and blocks another light. The second polarizing film 134 transmits light having an electric field and a magnetic field oscillating in a second direction and blocks another light. In this case, the first direction and the second direction are orthogonal to each other. That is, the polarization direction of the light transmitted by the first polarizing film 124 and the oscillating direction of the light transmitted by the second polarizing film 134 are orthogonal to each other. As a result, generally, light may not transmit simultaneously the first polarizing film and the second polarizing film.

The display panel 100 may include a light absorbing layer 140. The light absorbing layer 140 may be disposed to allow light passed through the liquid crystal panel 110 and the polarizing plate to be incident thereon. Light emitted from the light source sequentially passes through the first polarizing plate 120, the liquid crystal panel 110, and the second polarizing plate 130, and light transmitted through the second polarizing plate 130 is incident to the light absorbing layer 140.

Light supplied from the light source passes through the display panel 100 and may be diffused due to a difference in refractive index between the internal components of the display panel 100. Due to such a phenomenon, a desired color may not be expressed due to light leaking from the display panel 100 at a position separated by a predetermined angle from the front of the display apparatus 1. A light absorbing portion 170 may absorb the light unnecessarily emitted as above or reflect the light toward the front, thereby improving the image quality of the display apparatus 1.

The light absorbing layer 140 may include a first resin layer 150, a second resin layer 160, and the light absorbing portion 170. The first and second resin layers may include a transparent resin capable of transmitting light. The first and second resin layers may be formed to have a width corresponding to a width of the second polarizing plate 130.

The first resin layer 150 may be disposed on a rear surface of the second resin layer 160. The first and second resin layers may be formed to have the width corresponding to each other. The first resin layer 150 may have a lower refractive index than the second resin layer 160. Because the first and second resin layers have an optical surface parallel to the liquid crystal panel 110, light may be inclined further forward while traveling from the first resin layer 150 to the second resin layer 160. In other words, light directs further forward while passing through the first and second resin layers. A difference between refractive indices n1 and n2 of the first and second resin layers may be 0.1 or more.

The first resin layer 150 may include a first optical surface 152 facing the first polarizing plate 120, and a second optical surface 154 in contact with the second resin layer 160 that is opposite the first optical surface 152. The first resin layer 150 may include concave grooves 156 formed on the first optical surface 152. The concave grooves 156 may have a cross section formed in a trapezoidal shape. However, a cross-sectional shape of the concave grooves 156 is not limited thereto. For example, the concave grooves 156 may have a cross section formed in a triangle, a quadrangle, a part of a circle, a semicircle, an ellipse, or a combination thereof.

The light absorbing portions 170 may absorb a part of the light passing through the light absorbing layer 140. The light absorbing portions 170 may be provided on the first resin layer 150. In detail, the light absorbing portions 170 may be disposed in the concave grooves 156 formed on the first optical surface 152 of the first resin layer 150. The light absorbing portions 170 may be provided to be filled in concave spaces formed in the concave grooves 156. The present embodiment illustrates and describes that the light absorbing portions 170 are fully filled in the concave grooves 156, respectively. However, the present disclosure is not limited thereto, and the amount of the light absorbing portions filled in the concave grooves 156 may vary depending on the shape, size, purpose, and the like of the display apparatus 1. Light inclined by a predetermined angle or more with respect to a front-rear axis in the light directing to the light absorbing layer 140 may be absorbed by the light absorbing portions 170.

The present embodiment describes that the concave grooves 156 formed in the first resin layer 150 are formed on the first optical surface 152 and the light absorbing portions 170 are disposed in the concave grooves 156. However, the present disclosure is not limited thereto. For example, the concave grooves 156 may be formed on the second optical surface 154, and the light absorbing portions 170 may be disposed in the concave grooves 156 formed on the second optical surface, or the light absorbing portions 170 may be disposed on the first resin layer 150 without being exposed through the first and second optical surfaces. It is sufficient that the light absorbing portions 170 are disposed on the first resin layer 150 to absorb a part of the light passing through the light absorbing layer 140.

The light absorbing portions 170 may be formed such that a length of the cross section thereof in the front-rear direction is longer than a width of the cross section thereof in the left-right direction. Through this configuration, light inclined by a predetermined angle or more with respect to the front of the display apparatus 1 in the light incident on the light absorbing layer 140 may be efficiently absorbed. In addition, light incident on the light absorbing layer 140 through the light absorbing portion 170 may substantially direct to the front of the display apparatus 1.

As illustrated in FIG. 4, the light absorbing portions 170 may be formed to be elongated in one direction on the first resin layer 150 and may be arranged in a direction orthogonal to the one direction. In the present embodiment, the light absorbing portions 170 are elongated in a longitudinal direction of the first resin layer 150 and arranged in a transverse direction. That is, referring to the direction in FIG. 1, the light absorbing portions 170 are elongated in the up-down direction of the first resin layer 150 and arranged in the left-right direction. In the present embodiment, the light absorbing portions 170 are uniformly arranged on the first resin layer 150. Through this configuration, light inclined by a predetermined angle or more in the left-right direction about a reference axis in the front-rear direction may be prevented from being emitted in the left-right direction of the display panel 100.

The concave grooves 156 may also be formed on the first resin layer 150 as described above to correspond to the light absorbing portions 170 disposed on the first resin layer 150. That is, the concave grooves 156 may be formed to be elongated in one direction on the first resin layer 150 and may be arranged in a direction orthogonal to the one direction. In the present embodiment, the concave grooves 156 may be elongated in the longitudinal direction of the first resin layer 150 and arranged in the transverse direction. That is, the concave grooves 156 may be elongated in the up-down direction of the first resin layer 150 and arranged in the left-right direction.

The light absorbing portions 170 may be uniformly arranged on the first resin layer 150. The light absorbing portion 170 may include a first absorbing portion 171, a second absorbing portion 172 spaced apart from the first absorbing portion 171 by a first distance L1, and a third absorbing portion 173 spaced apart from the second absorbing portion 172 by a second distance L2. In the present embodiment, the first and second distances L1 and L2 may be the same. That is, the light absorbing portions 170 may be arranged on the first resin layer 150 to be spaced apart from each other by a predetermined distance.

Light passing through the liquid crystal panel 110 may be absorbed in or reflected by the light absorbing portions 170 spaced apart by the predetermined distance so that only light inclined at a predetermined angle or less about the reference axis of the front-rear direction may be emitted. Thereafter, the light emitted from the first resin layer 150 may be further refracted toward the front while being incident on the second resin layer 160. The present embodiment illustrates and describes that the second optical surface 154 of the first resin layer 150 and the optical surface of the second resin layer 160 facing the first resin layer 150 are in contact with each other in a planar shape. However, the present disclosure is not limited thereto, and the contact surfaces of the first resin layer 150 and the second resin layer 160 may be in contact with each other with a pattern having a predetermined shape. As an example, the first and second resin layers may be in contact with each other such that cross sections of the contact surfaces have a shape such as a triangle, a quadrangle, a circle, and an ellipse.

The light absorbing portions 170 may include at least one of carbon black, black resin, a mixture of metal particles, graphite powder, gravure ink, black spray, and black enamel.

A cross-sectional shape of the light absorbing portions 170 may be formed to correspond to the cross-sectional shape of the concave grooves 156. The cross-sections of the light absorbing portions 170 and the concave grooves 156 may be formed in a trapezoidal shape whose width becomes narrow according to a depth thereof. When the width and a height of the cross section of the light absorbing portion 170 are La and Lb, respectively, and a distance between a plurality of arrangements of the light absorbing portion 170 is Lc, the following may be satisfied.

$$5\ \mu m \leq La \leq 20\ \mu m$$

$$10\ \mu m \leq Lb \leq 40\ \mu m$$

$$15\ \mu m \leq Lc \leq 50\ \mu m$$

In the present embodiment, La, Lb, and Lc are described for a case where the cross-sectional shape of the light absorbing portions 170 is trapezoidal, but the shape of the light absorbing portions 170 may be changed when the above relationship is satisfied.

The display panel 100 may include an adhesive layer 180. The adhesive layer 180 may be disposed between the light absorbing layer 140 and the second polarizing plate 130. The adhesive layer 180 may be provided such that the light absorbing layer 140 may be adhered to the second polarizing plate 130. The adhesive layer 180 may be configured to have a refractive index equal to or less than that of the first resin layer 150. That is, the adhesive layer 180 may be configured to have a refractive index equal to or less than that of the first resin layer 150 so that an emission angle of the light emitted from the second polarizing plate 130 is not increased by the adhesive layer 180.

The display panel 100 may include a support film 190 provided on an outer surface of the light absorbing layer 140. The support film 190 may be provided to be in contact with an outer surface of the second resin layer 160 of the light absorbing layer 140. The support film 190 may include a tri-acetyl cellulose (TAC) film, PET, and acrylic. The display panel 100 may include a surface layer 192 provided on an outer surface of the support film 190.

The light absorption layer 140 may be manufactured as a single module and adhered to the polarizing plate. That is, the first and second polarizing plates and the liquid crystal panel 110 may be manufactured separately from the light absorbing layer 140 and then coupled thereto.

In order to manufacture the light absorption layer 140, the first resin layers 150 may be provided on an upper surface of the second resin layer 160 to be layered. Thereafter, the concave groove 156 may be formed in the first resin layer 150, and the light absorbing portion 170 may be injected or inserted into the concave groove 156. The light absorption layer 140 manufactured by the above method may be adhered to one surface of the second polarizing plate 130 through the adhesive layer 180.

The support film 190 or the surface layer 192 provided on the outer surface of the light absorbing layer 140 may be layered on an upper surface of the light absorbing layer 140 after the light absorbing layer 140 is adhered to the second polarizing plate 130. However, the present disclosure is not limited thereto, and when the light absorption layer 140 is manufactured as one module, it may be made to form a bottom surface of the second resin layer 160.

Hereinafter, a display apparatus according to another embodiment of the present disclosure will be described. The same configuration as that described above will be omitted.

Figure 6:
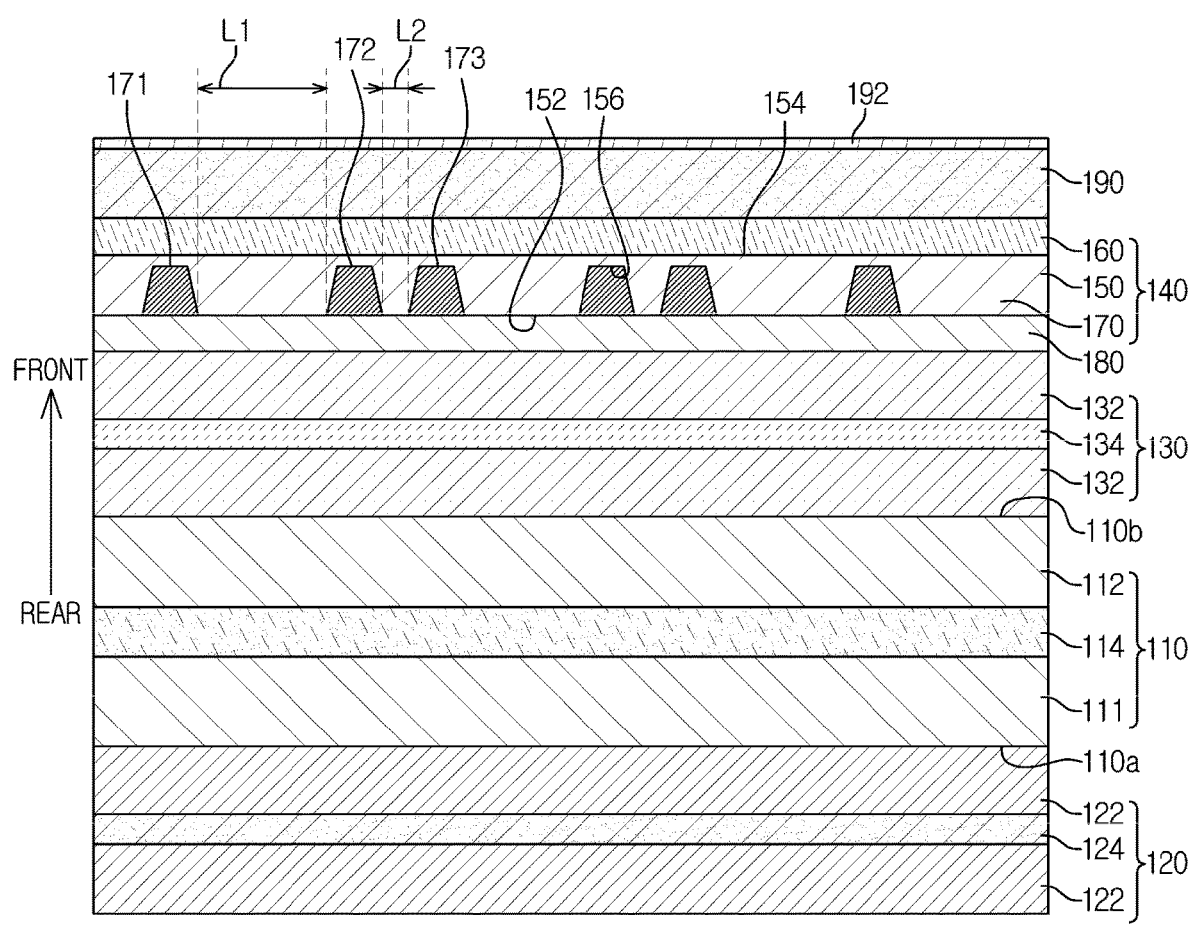
FIG. 6 is a cross-sectional view of a display panel of a display apparatus according to another embodiment of the present disclosure.

FIG. 6 is a cross-sectional view of a display panel of a display apparatus according to another embodiment of the present disclosure.

The light absorbing portion 170 may include the first absorbing portion 171, the second absorbing portion 172 spaced apart from the first absorbing portion 171 by the first distance L1, and the third absorbing portion 173 spaced apart from the second absorbing portion 172 by the second distance L2. The first and second distances L1 and L2 may be different from each other. The distance between the plurality of light absorbing portions 170 may vary depending on the arrangement of the light source, the optical sheet 50 or an internal configuration of the display panel 100.

Hereinafter, a display apparatus according to another embodiment of the present disclosure will be described. The same configuration as that described above will be omitted.

FIGS. 7 to 11 are cross-sectional views of a display panel of a display apparatus according to another embodiment of the present disclosure.

Figure 7:
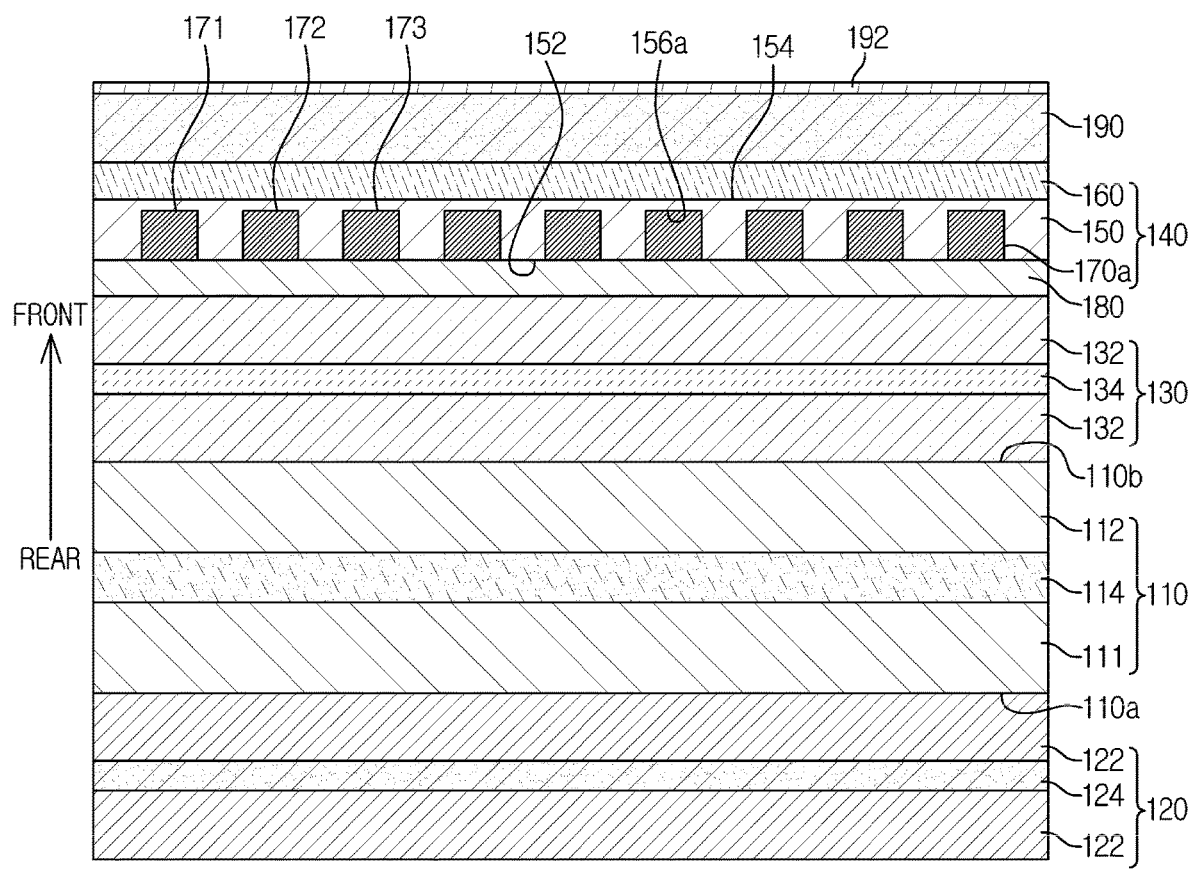
FIGS. 7 to 11 are cross-sectional views of a display panel of a display apparatus according to another embodiment of the present disclosure.

As illustrated in FIG. 7, the first resin layer 150 may include a concave groove 156a formed to be concave. The concave groove 156a may be formed in a rectangular shape. Accordingly, a light absorbing portion 170a filled in a concave space formed by the concave groove 156a may also be formed in a rectangular shape.

Figure 8:
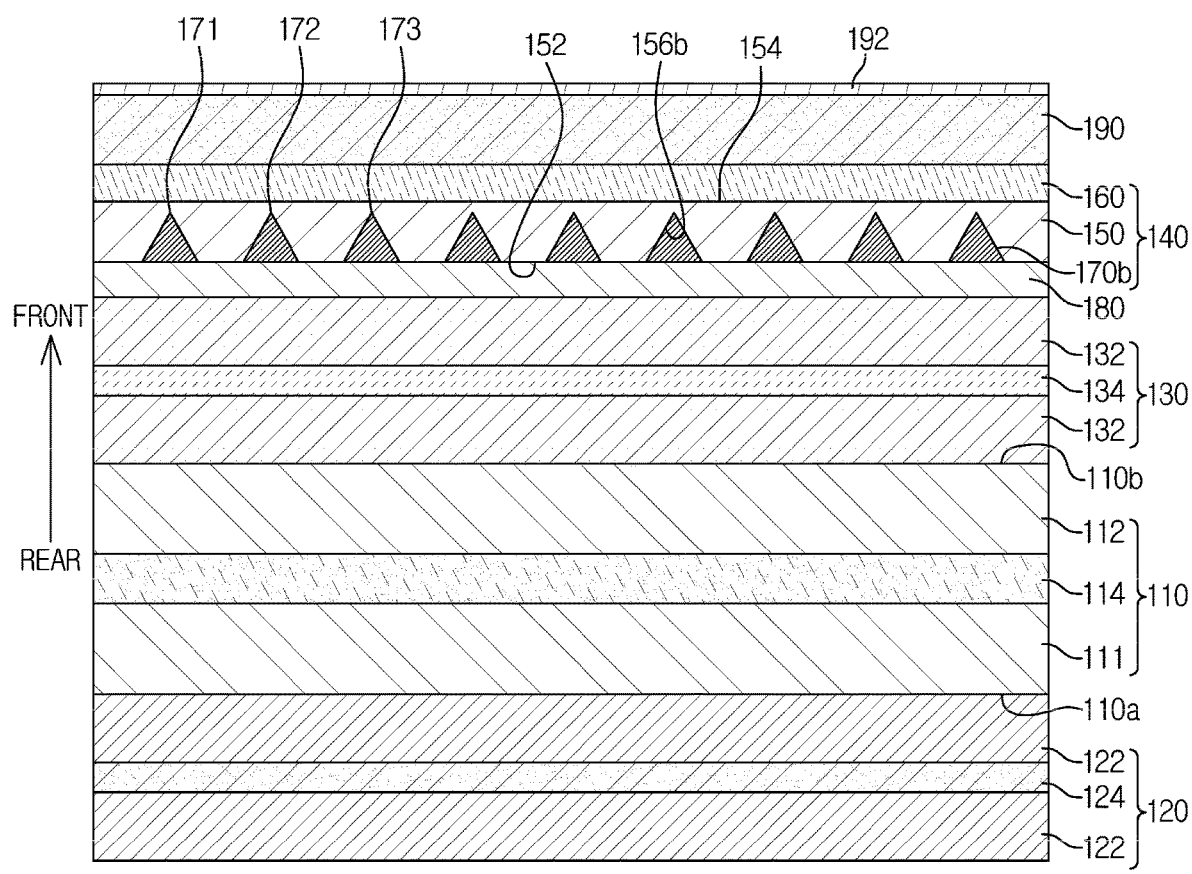

As illustrated in FIG. 8, a concave groove 156b may be formed in a triangular shape. Accordingly, a light absorbing portion 170b filled in a concave space formed by the concave groove 156b may also be formed in a triangular shape.

Figure 9:
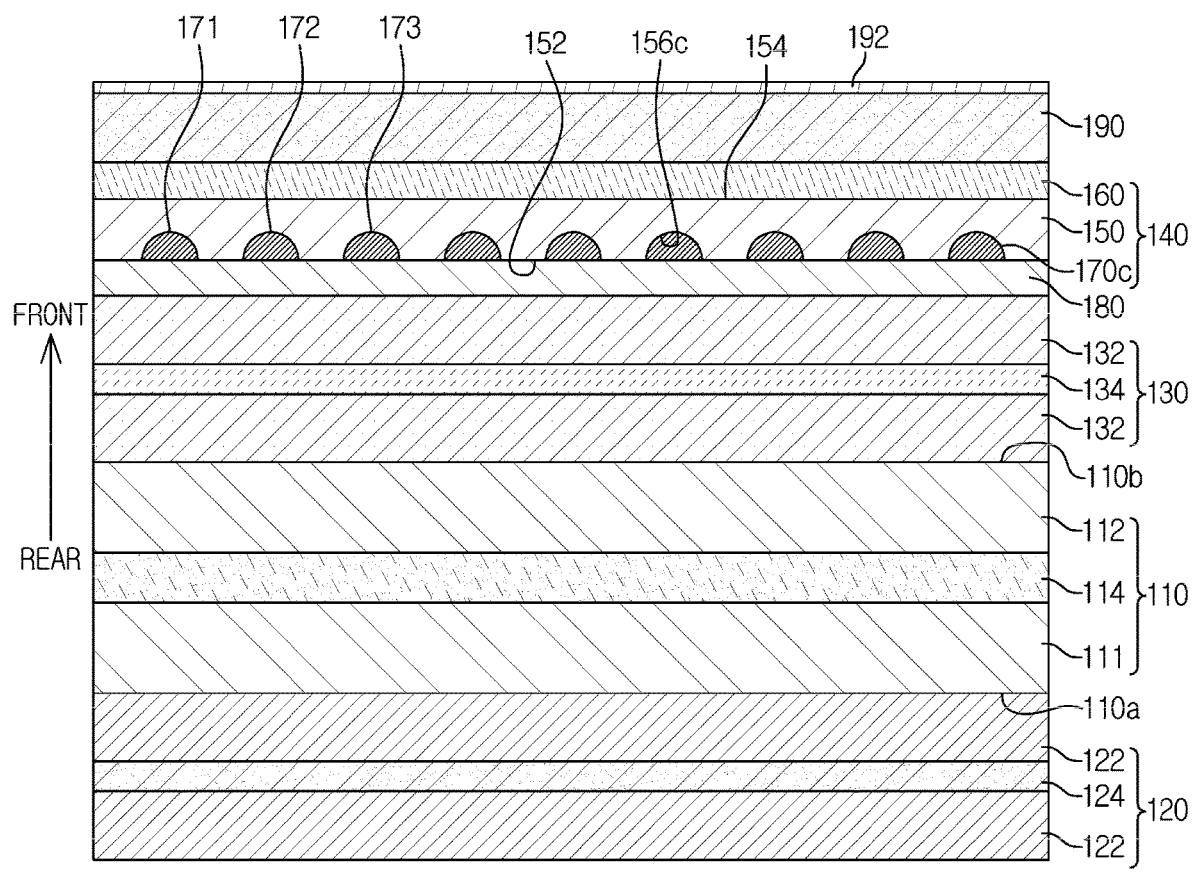

As illustrated in FIG. 9, a concave groove 156c may be formed in a semicircular shape. Accordingly, a light absorbing portion 170c filled in a concave space formed by the concave groove 156c may also be formed in a semicircular shape.

Figure 10:
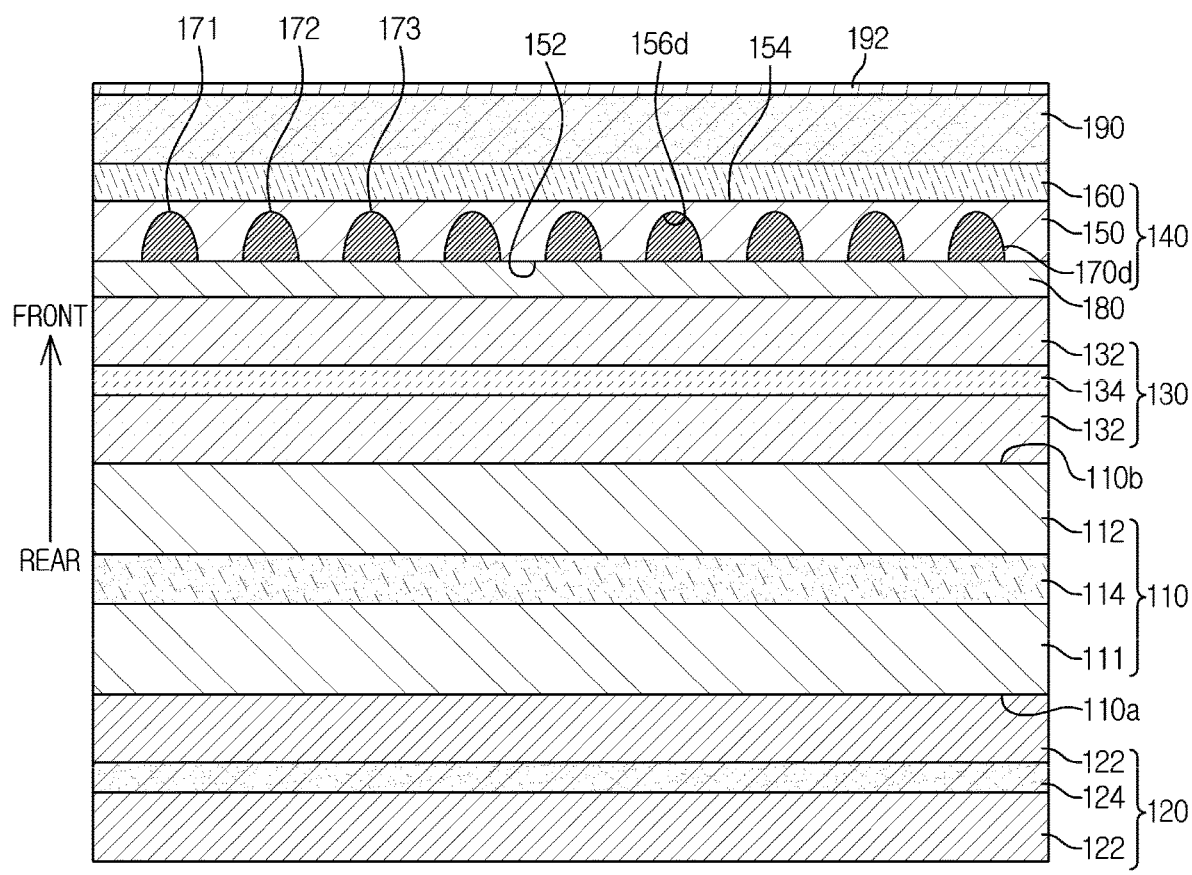

As illustrated in FIG. 10, a concave groove 156d may be formed in an elliptic shape. Accordingly, a light absorbing portion 170d filled in a concave space formed by the concave groove 156d may also be formed in an elliptic shape.

Figure 11:
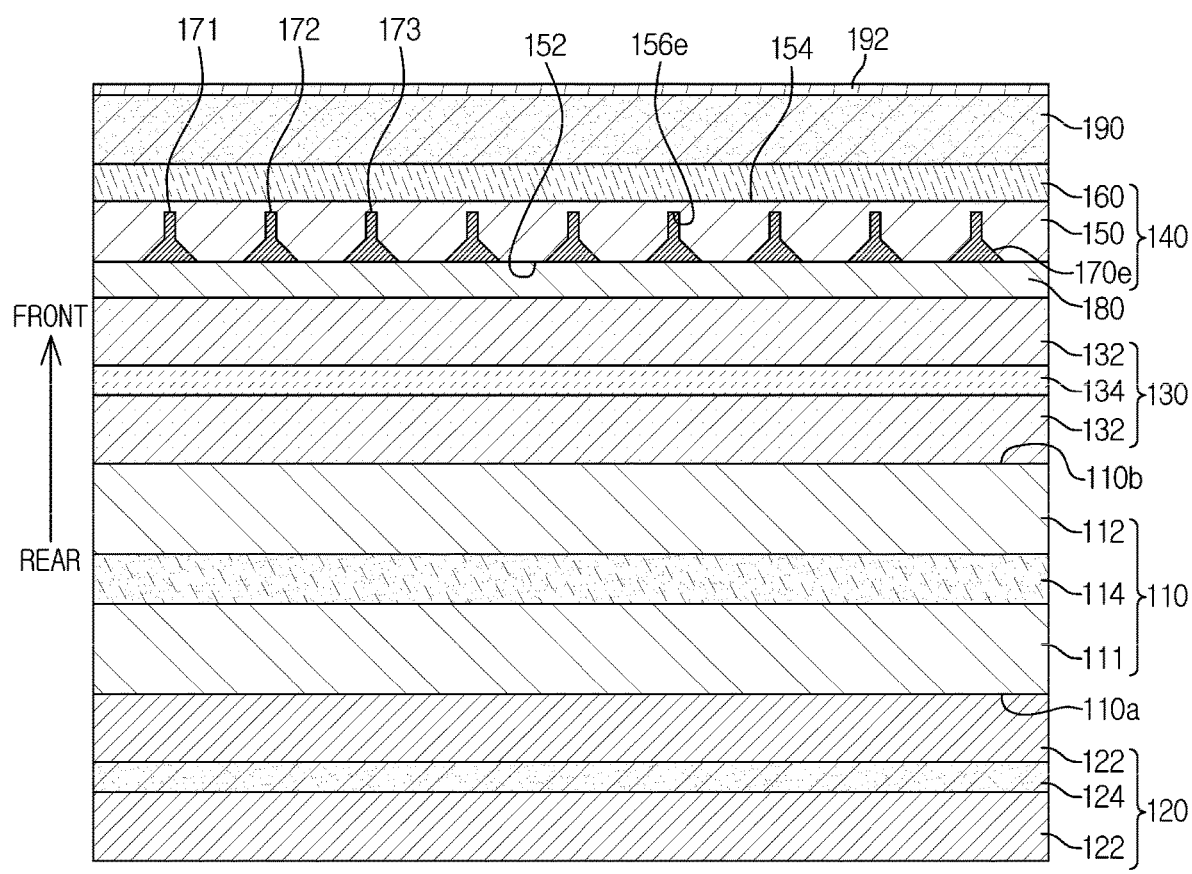

As illustrated in FIG. 11, a concave groove 156e may be formed in a combination of the above shapes. This figure illustrates that the concave groove 156e is formed in a combination of triangle and rectangular shapes. Accordingly, a light absorbing portion 170e filled in a concave space formed by the concave groove 156e may also be formed in a combination of triangle and rectangular shapes.

Hereinafter, a display apparatus according to another embodiment of the present disclosure will be described. The same configuration as that described above will be omitted.

FIGS. 12 to 17 are perspective views of a first resin layer of a display apparatus according to another embodiment of the present disclosure.

Figure 12:
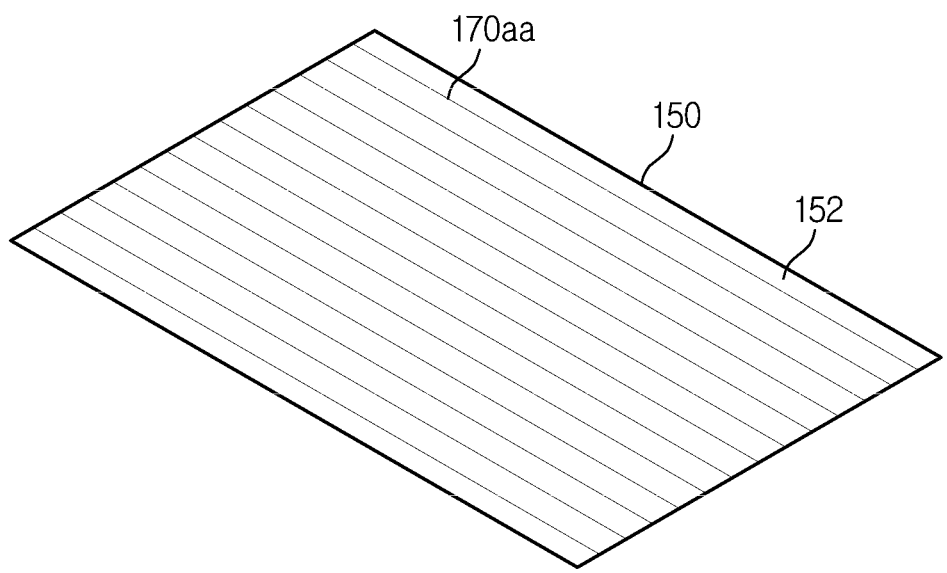
FIGS. 12 to 18 are perspective views of a first resin layer of a display apparatus according to another embodiment of the present disclosure.

As illustrated in FIG. 12, a plurality of light absorbing portions 170aa may be provided and arranged on the first resin layer 150. The light absorbing portions 170aa may be configured to be elongated in the left-right direction of the display panel 100 and to be arranged in the up-down direction. The light absorbing portions 170aa may be uniformly arranged on the first resin layer 150. Through this configuration, light inclined by a predetermined angle or more in the up-down direction about the reference axis in the front-rear direction may be prevented from being emitted in the up-down direction of the display panel 100.

Figure 13:
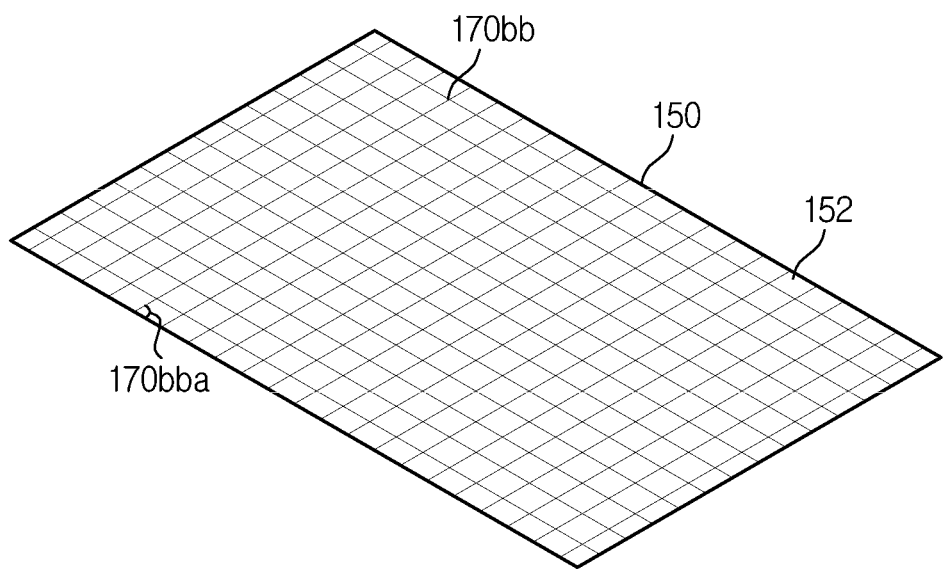

As illustrated in FIG. 13, light absorbing portions 170bb are configured to be elongated to cross each other in the left-right direction and the up-down direction of the display panel 100 and to be arranged in the up-down direction and the left-right direction, respectively. The light absorbing portions 170bb may be arranged on the first resin layer 150. The light absorbing portions 170bb may be uniformly arranged on the first resin layer 150. Through this configuration, light may be prevented from being inclined and emitted by a predetermined angle or more in the up, down, left, and right directions of the display panel 100.

As illustrated in FIG. 13, the light absorbing portions 170bb may be arranged in the up-down direction and left-right direction and may be formed to be inclined at a predetermined angle 170bba. The predetermined angle 170bba may satisfy the following.

$$0 \text{ degrees} \leq 170bba \leq 90 \text{ degrees}$$

Figure 14:
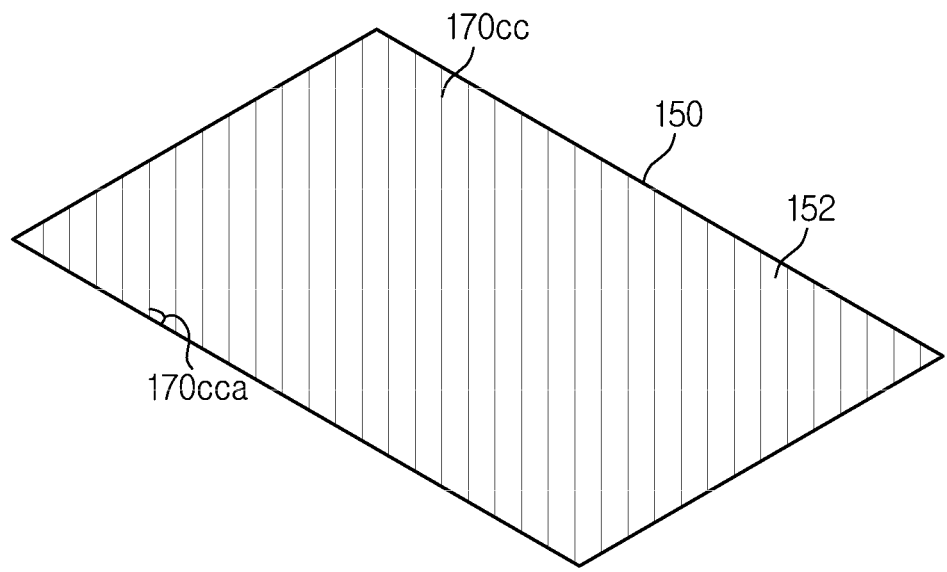

As illustrated in FIG. 14, light absorbing portions 170cc are configured to be elongated in a diagonal direction of the display panel 100 and to be arranged in a direction orthogonal to the diagonal directions, respectively. The light absorbing portions 170cc may be arranged on the first resin layer 150. The light absorbing portions 170cc may be uniformly arranged on the first resin layer 150. Through this configuration, light may be prevented from being inclined and emitted by a predetermined angle or more toward a direction orthogonal to a diagonal direction with respect to the front of the display panel 100.

As illustrated in FIG. 14, the light absorbing portions 170cc may be formed to be inclined at a predetermined angle 170bba. The predetermined angle 170cca may satisfy the following.

$$0 \text{ degrees} \leq 170cca \leq 180 \text{ degrees}$$

Figure 15:
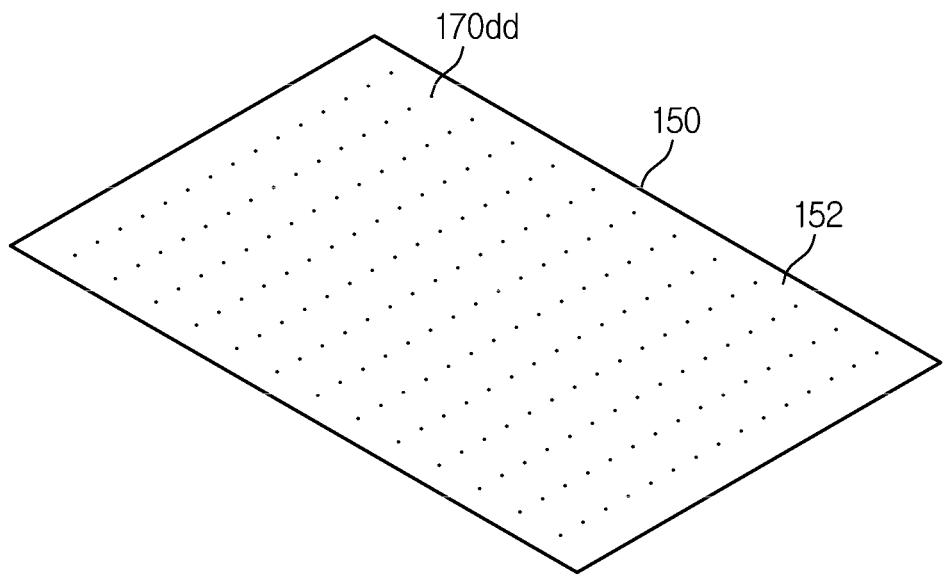

As illustrated in FIG. 15, light absorbing portions 170dd may be formed in a dot shape and distributed on the first resin layer 150. The light absorbing portions 170dd may be uniformly distributed as shown in the drawing, or may be distributed to be concentrated in a predetermined region.

Figure 16:
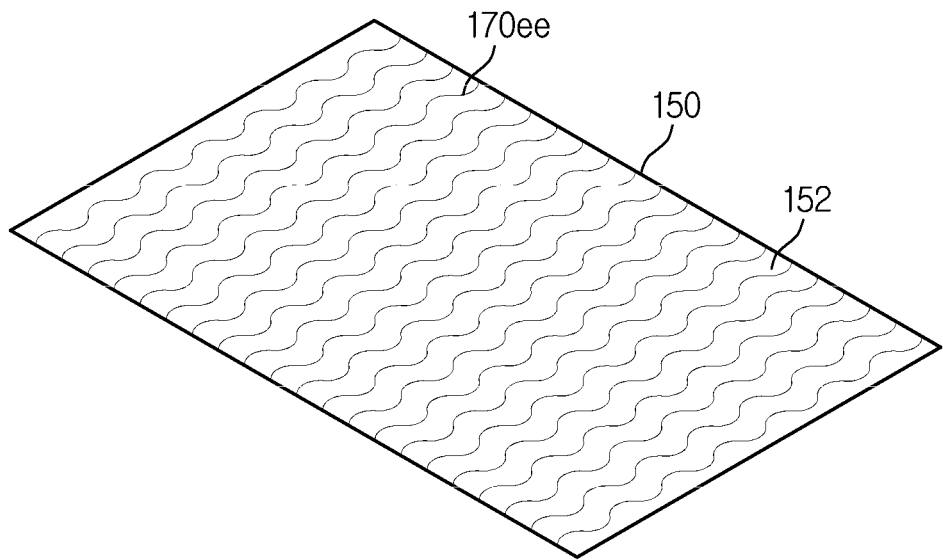

As illustrated in FIG. 16, light absorbing portions 170ee may be configured to be elongated in a wave shape in one direction on the first resin layer 150 and to be arranged in a direction orthogonal to the one direction. The light absorbing portions 170ee may be uniformly arranged on the first resin layer 150. Through this configuration, light may be prevented from being inclined and emitted by a predetermined angle or more in the up, down, left, and right directions of the display panel 100.

Figure 17:
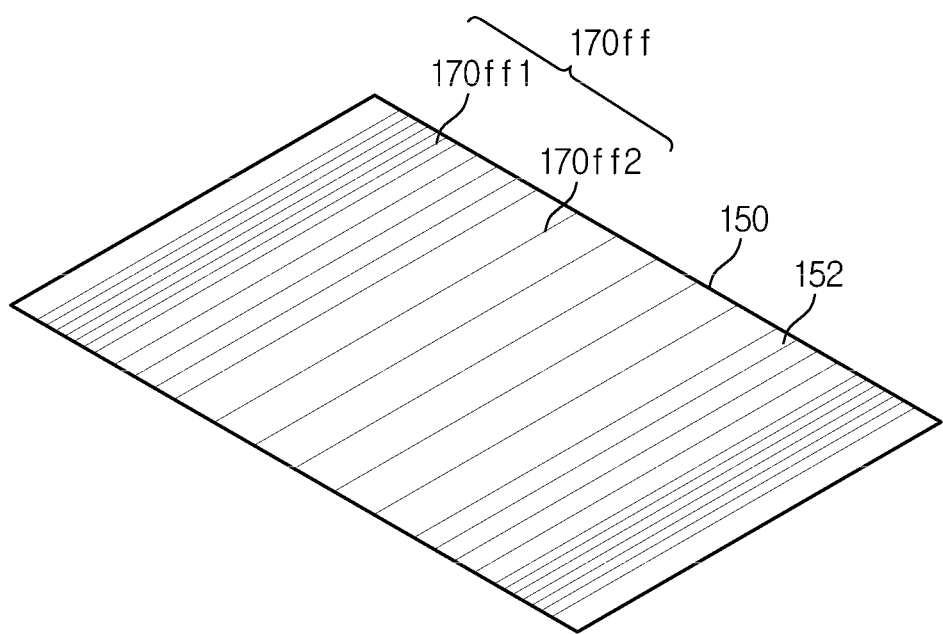

As illustrated in FIG. 17, light absorbing portions 170ff are arranged on the first resin layer 150 and may be arranged with different density degrees according to regions. The light absorbing portions 170ff may include first light absorbing portions 177ff1 disposed on a first region of the first resin layer 150 and second light absorbing portions 177ff2 disposed on a second region. The first light absorbing portions 177ff1 may be arranged to be denser than the second light absorbing portions 177ff2. The present embodiment illustrates that the first region is disposed on the left and right sides of the second region, but the present disclosure is not limited thereto.

Figure 18:
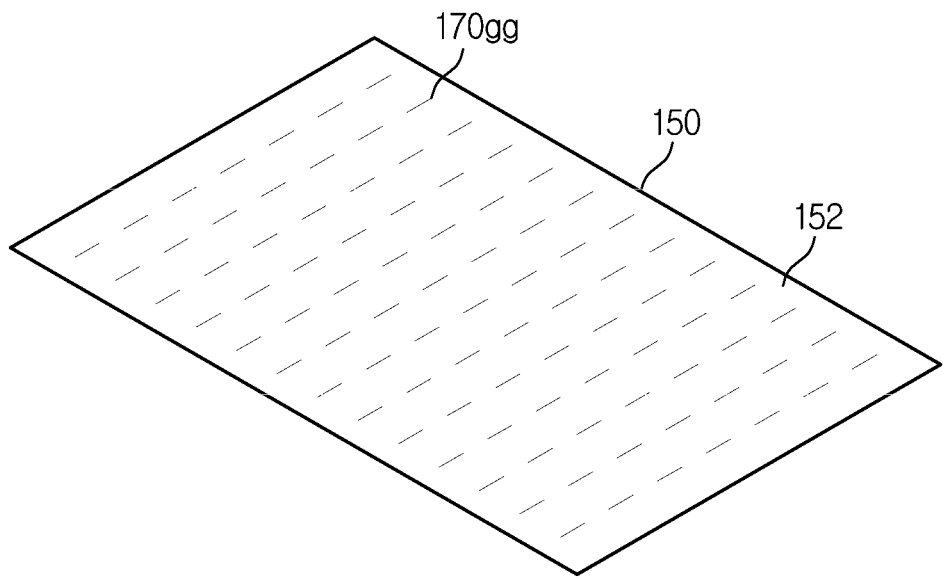

As illustrated in FIG. 18, light absorbing portions 170gg may be formed in a rod shape having a predetermined length and distributed on the first resin layer 150. The light absorbing portions 170dd may be uniformly distributed as shown in the drawing, or may be distributed to be concentrated in a predetermined region.

Hereinafter, a display apparatus according to another embodiment of the present disclosure will be described. The same configuration as that described above will be omitted.

Figure 19:
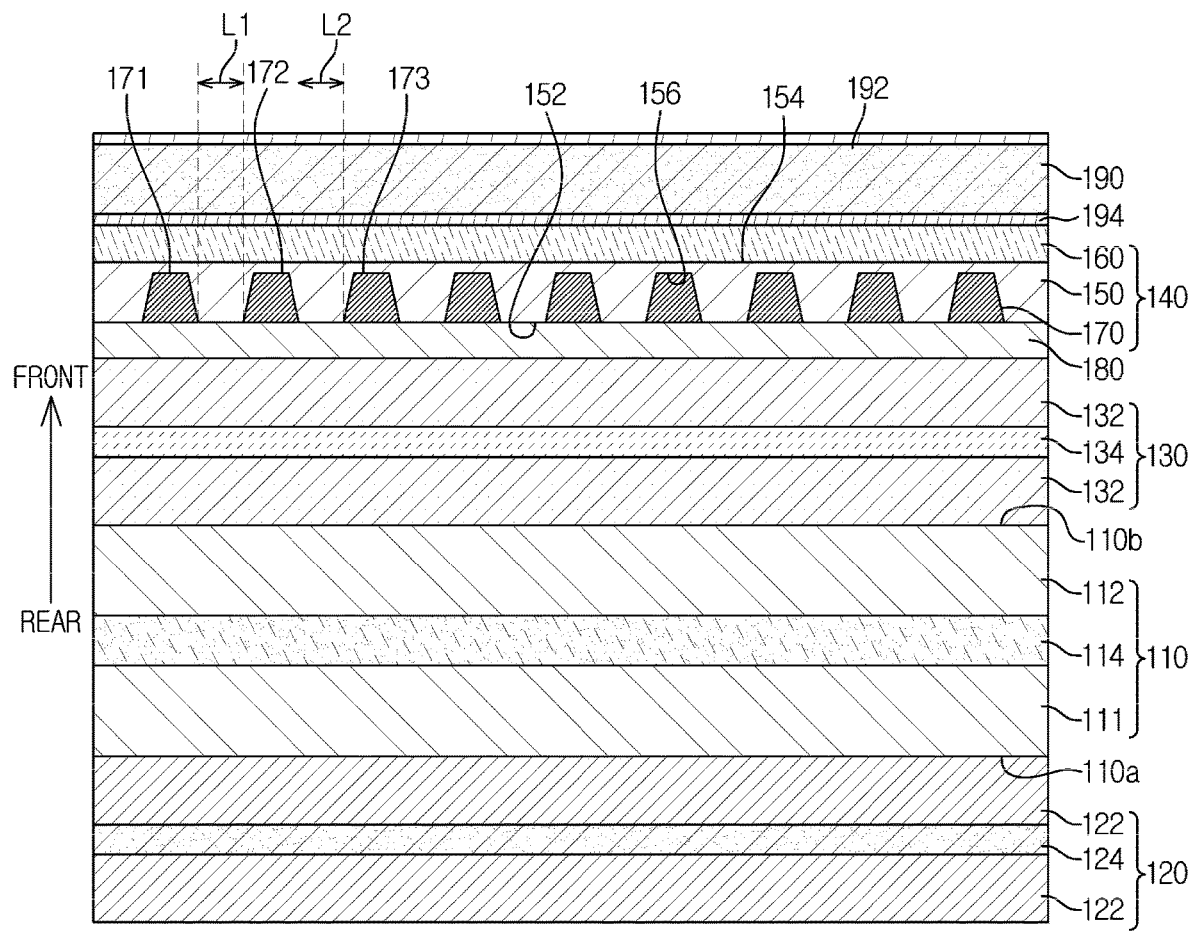
FIG. 19 is a cross-sectional view of a display panel of a display apparatus according to another embodiment of the present disclosure.

FIG. 19 is a cross-sectional view of a display panel of a display apparatus according to another embodiment of the present disclosure.

The display panel 100 may further include a protective film 194 between the support film 190 and the second resin layer 160. The protective film 194 may include a tri-acetyl cellulose (TAC) film, PET, and acrylic.

While the present disclosure has been particularly described with reference to exemplary embodiments, it should be understood by those of skilled in the art that various changes in form and details may be made without departing from the spirit and scope of the present disclosure.

The invention claimed is:

1. A display apparatus comprising:
 a light source configured to generate light; and
 a display panel configured to receive light from the light source,
 wherein the display panel comprises:
  a liquid crystal panel;
  a first polarizing plate coupled to a rear of the liquid crystal panel;
  a second polarizing plate coupled to a front of the liquid crystal panel;
  a light absorbing layer on which light passed sequentially through the first polarizing plate, the liquid crystal panel, and the second polarizing plate is incident, the light absorbing layer being disposed on a front surface of the second polarizing plate; and
  a support film coupled to a front of the light absorbing layer,
 wherein the first polarizing plate comprises a pair of first protective films and a first polarizing film between the pair of first protective films,
 wherein the second polarizing plate comprises a second polarizing film and a second protective film coupled to a front of the second polarizing film, and
 wherein the light absorbing layer comprises:
  a first resin layer;
  a second resin layer on which light passed through the first resin layer is incident, the second resin layer having a refractive index higher than a refractive index of the first resin layer; and
  light absorbing portions disposed on the first resin layer and configured to absorb a part of light passing through the light absorbing layer, and
 wherein the light absorbing layer is disposed between the support film and the second protective film,
 wherein a third protective film is disposed between the support film and the second resin layer,
 wherein the light absorbing portions have a hemispherical or elliptical cross section as a whole, and
 wherein the light absorbing portions are configured to be elongated in a diagonal direction of the display panel and to be arranged to be spaced apart in a direction orthogonal to the diagonal direction, respectively.

2. The display apparatus according to claim 1, wherein light inclined by a predetermined angle or more from a reference axis in a front-rear direction in the light incident on the light absorbing layer is absorbed by the light absorbing portions.

3. The display apparatus according to claim 1, wherein the first resin layer comprises:
 an optical surface facing the second polarizing plate to allow the light sequentially passed through the first polarizing plate, the liquid crystal panel, and the second polarizing plate to be incident thereon; and
 a plurality of grooves formed to be recessed on the optical surface, and
 wherein the light absorbing portions are disposed in the plurality of grooves.

4. The display apparatus according to claim 3, wherein the plurality of grooves is formed to be elongated in one direction on the optical surface and arranged in a direction orthogonal to the one direction.

5. The display apparatus according to claim 1, wherein the display panel further comprises an adhesive layer disposed between the light absorbing layer and the second polarizing plate to adhere the light absorbing layer and the second polarizing plate, and
 the adhesive layer is formed with a refractive index equal to or less than refractive index of the first resin layer.

6. The display apparatus according to claim 1, wherein the light absorbing layer comprises black resin.

7. The display apparatus according to claim 1, wherein the light absorbing layer comprises one of carbon black, graphite powder, gravure ink, black spray, or black enamel.

8. The display apparatus according to claim 1, wherein the light absorbing portions comprise a first light absorbing portion, a second light absorbing portion spaced apart from the first light absorbing portion by a first distance, and a third light absorbing portion spaced apart from the second light absorbing portion by a second distance, and
 the first distance and the second distance are different from each other.

* * * * *